(12) United States Patent
Gudimetla

(10) Patent No.: US 11,913,586 B2
(45) Date of Patent: Feb. 27, 2024

(54) MULTI-FUNCTION ORIFICE SUBASSEMBLY FOR FLOW LIMITERS

(71) Applicant: The Boeing Company, Chicago, IL (US)

(72) Inventor: Chandra Sudhakar Gudimetla, Bengaluru (IN)

(73) Assignee: The Boeing Company, Chicago, IL (US)

( * ) Notice: Subject to any disclaimer, the term of this patent is extended or adjusted under 35 U.S.C. 154(b) by 202 days.

(21) Appl. No.: 17/359,185

(22) Filed: Jun. 25, 2021

(65) Prior Publication Data
US 2022/0049722 A1 Feb. 17, 2022

Related U.S. Application Data

(60) Provisional application No. 63/064,347, filed on Aug. 11, 2020.

(51) Int. Cl.
*F16L 55/027* (2006.01)
*G05D 7/01* (2006.01)
(Continued)

(52) U.S. Cl.
CPC ............ *F16L 55/027* (2013.01); *F16K 17/30* (2013.01); *F16K 17/34* (2013.01);
(Continued)

(58) Field of Classification Search
CPC . F15B 2013/008; F15B 13/023; F16L 55/027; F16L 55/02781; F16L 55/055;
(Continued)

(56) References Cited

U.S. PATENT DOCUMENTS 649,779 A * 5/1900 Tyler ..................... F16L 55/027
138/40
1,939,509 A * 12/1933 McClelland ........ G01L 19/0007
137/557
(Continued)

FOREIGN PATENT DOCUMENTS

JP H0590100 U * 12/1993 .............. F17C 13/00

*Primary Examiner* — Robert K Arundale
*Assistant Examiner* — Richard K. Durden
(74) *Attorney, Agent, or Firm* — FERGUSON BRASWELL FRASER KUBASTA PC

(57) ABSTRACT

A flow limiter component including a monocoque body having first, second, and third sections along a longitudinal axis. The first section includes a first end defining a first edge of the monocoque body and a bordering second end, and a first inner diameter defining a first chamber inside the first section. The second section includes a solid wall, with an orifice disposed therein, in fluid communication with the first chamber, the orifice defined by a second inner diameter. The third section includes a third end bordering the second section and a fourth end defining a second edge of the body, and a third inner diameter, the third inner diameter defining a second chamber in the third section. The second chamber is in fluid communication with the orifice. The first inner diameter is greater than the third inner diameter, and the third inner diameter is greater than the second inner diameter.

20 Claims, 12 Drawing Sheets

(51) Int. Cl.
*G05D 16/10* (2006.01)
*F16K 17/30* (2006.01)
*F16K 17/34* (2006.01)
*F15B 13/00* (2006.01)

(52) U.S. Cl.
CPC ... *F16L 55/02718* (2013.01); *F16L 55/02781* (2013.01); *G05D 7/0133* (2013.01); *F15B 2013/008* (2013.01); *G05D 7/014* (2013.01); *G05D 16/101* (2019.01); *G05D 16/103* (2013.01)

(58) Field of Classification Search
CPC . F16N 27/005; G01L 19/0609; G05D 7/0133; G05D 7/014; G05D 7/0186; G05D 16/101; G05D 16/103; Y10T 137/7785; Y10T 137/7792; Y10T 137/7808; Y10T 137/7852
USPC ............................. 73/707; 239/238, 571, 580
See application file for complete search history.

(56) References Cited

U.S. PATENT DOCUMENTS

| | | | | |
|---|---|---|---|---|
| 2,354,161 A * | 7/1944 | Waterman | ............ | F16K 17/30 137/514.7 |
| 2,393,423 A * | 1/1946 | Sekera | ............ | F16L 55/027 138/41 |
| 2,416,881 A * | 3/1947 | Osborn | ............ | G05D 16/101 137/508 |
| 2,457,578 A * | 12/1948 | Maliphant | ............ | B60T 17/002 138/41 |
| 2,486,133 A * | 10/1949 | Egger | ............ | G01L 19/0007 138/41 |
| 2,512,190 A * | 6/1950 | Waterman | ............ | F16K 17/30 137/514.7 |
| 2,662,541 A * | 12/1953 | Noon | ............ | G05D 7/0106 138/44 |
| 2,845,087 A * | 7/1958 | Thomas | ............ | G05D 7/0133 137/504 |
| 3,015,341 A * | 1/1962 | Hedlend | ............ | G05D 7/0133 137/493 |
| 3,109,459 A * | 11/1963 | Lee, II | ............ | F15B 21/00 138/40 |
| 3,717,167 A | 2/1973 | Allen | | |
| 4,426,213 A * | 1/1984 | Stavropoulos | ............ | F16T 1/34 138/44 |
| 4,552,324 A * | 11/1985 | Hrusch | ............ | F16F 9/06 267/64.22 |
| 4,700,733 A * | 10/1987 | Uchino | ............ | B62D 5/08 137/504 |
| 5,205,321 A * | 4/1993 | Maroney | ............ | F16K 17/048 137/504 |
| 6,000,433 A * | 12/1999 | Carroll | ............ | B01D 46/10 138/44 |
| 6,158,679 A * | 12/2000 | Ohmi | ............ | G05D 7/0186 239/589 |
| 8,038,094 B2 * | 10/2011 | Oyama | ............ | B64C 25/50 244/99.6 |
| 10,145,501 B2 * | 12/2018 | Fisher | ............ | F16L 55/027 |
| 2001/0052368 A1 * | 12/2001 | Harms | ............ | F16H 61/0251 137/625.64 |
| 2017/0261118 A1 | 9/2017 | Sobieszek et al. | | |
| 2021/0254435 A1 * | 8/2021 | Zhu | ............ | E21B 43/12 |

\* cited by examiner

MULTI-FUNCTION ORIFICE SUBASSEMBLY FOR FLOW LIMITERS

CROSS-REFERENCE TO RELATED APPLICATIONS

This application claims priority under 35 U.S.C. § 119(e) to U.S. Provisional Patent Application No. 63/064,347, which filed on Aug. 11, 2020. U.S. Provisional Patent Application No. 63/064,347 is hereby incorporated by reference in its entirety.

BACKGROUND

Many aircraft use hydraulic systems for a variety of tasks, including, for example, in braking systems. Hydraulic systems include various components to control the flow and pressure of fluid within the fluid lines.

SUMMARY

The one or more embodiments provide for a flow limiter component including a monocoque body having a first section, a second section, and a third section arranged along a longitudinal axis of the monocoque body. The first section includes a first end defining a first edge of the monocoque body and a second end bordering the second section. The first section also includes a first inner diameter relative to the longitudinal axis, the first inner diameter defining a first chamber inside the first section. The second section includes a solid wall, wherein an orifice is disposed in the solid wall, in fluid communication with the first chamber, and wherein the orifice is defined by a second inner diameter relative to the longitudinal axis. The third section includes a third end bordering the second section and a fourth end defining a second edge of the monocoque body. The third section also includes a third inner diameter relative to the longitudinal axis, the third inner diameter defining a second chamber in the third section. The second chamber is in fluid communication with the orifice. The first inner diameter is greater than the third inner diameter, and the third inner diameter is greater than the second inner diameter.

The one or more embodiments also provide for an aircraft including a fuselage, a hydraulic system disposed in the fuselage, and a flow limiter operably disposed in the hydraulic system. The flow limiter includes a flow limiter component that includes a monocoque body having a first section, a second section, and a third section arranged along a longitudinal axis of the monocoque body. The first section includes a first end defining a first edge of the monocoque body and a second end bordering the second section; and a first inner diameter relative to the longitudinal axis, the first inner diameter defining a first chamber inside the first section. The second section includes a solid wall, wherein an orifice is disposed in the solid wall, in fluid communication with the first chamber, and wherein the orifice is defined by a second inner diameter relative to the longitudinal axis. The third section includes a third end bordering the second section and a fourth end defining a second edge of the monocoque body, and a third inner diameter relative to the longitudinal axis, the third inner diameter defining a second chamber in the third section. The second chamber is in fluid communication with the orifice. The first inner diameter is greater than the third inner diameter, and the third inner diameter is greater than the second inner diameter.

The one or more embodiments also provide for a method. The method includes installing a flow limiter in a hydraulic system of an aircraft. The flow limiter includes a flow limiter component that includes a monocoque body having a first section, a second section, and a third section arranged along a longitudinal axis of the monocoque body. The first section includes a first end defining a first edge of the monocoque body and a second end bordering the second section; and a first inner diameter relative to the longitudinal axis, the first inner diameter defining a first chamber inside the first section. The second section includes a solid wall, wherein an orifice is disposed in the solid wall, in fluid communication with the first chamber, and wherein the orifice is defined by a second inner diameter relative to the longitudinal axis. The third section includes a third end bordering the second section and a fourth end defining a second edge of the monocoque body, and a third inner diameter relative to the longitudinal axis, the third inner diameter defining a second chamber in the third section. The second chamber is in fluid communication with the orifice. The first inner diameter is greater than the third inner diameter, and the third inner diameter is greater than the second inner diameter.

Other aspects of the invention will be apparent from the following description and the appended claims.

DETAILED DESCRIPTION

Figure 1:
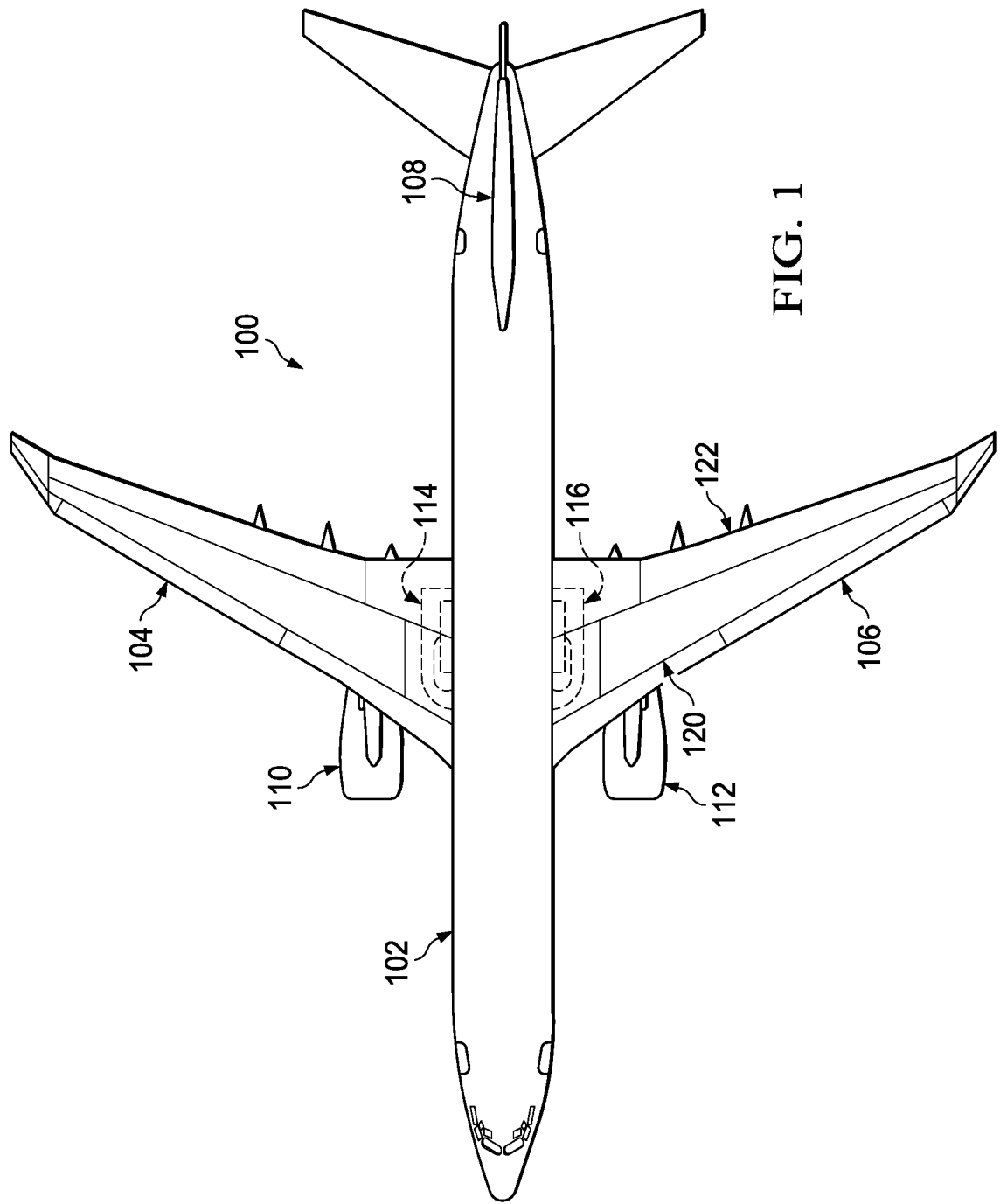
FIG. 1 shows an aircraft, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "substantially," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "substantially congruent" if the values of the two angles are within ten percent of each other. However, if an engineer determines that the engineering tolerance for a particular product should be tighter, then "substantially congruent" could be two angles having values that are within one percent of each other. Likewise, engineering tolerances could be loosened in other embodiments, such that "substantially congruent" angles have values within twenty percent of each other. In any case, the ordinary artisan is capable of assessing what is an acceptable engineering tolerance for a particular product, and thus is capable of assessing how to determine the variance of measurement contemplated by the term "substantially."

As used herein, the term "connected to" contemplates at least two meanings. In a first meaning, unless otherwise stated, "connected to" means that component A was, at least at some point, separate from component B, but then was later joined to component B in either a fixed or removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, embodiments of the invention relate to flow limiters. In one example, the one or more embodiments relate to flow limiters used in hydraulic systems or components of hydraulic systems. The flow limiter of the one or more embodiments has a series of chambers configured to limit the flow of a fluid, such as oil, through the flow limiter, and yet also include the interlocking mechanisms that allow the flow limiter to be interlocked with other components of the hydraulic system. Additional details and variants of the flow limiter are now described with respect to the figures.

FIG. 1 shows an aircraft, in accordance with one or more embodiments of the invention. The aircraft (100) may include a fuselage (102) and one or more wings, such as first wing (104) and second wing (106). The aircraft (100) may also include a tail (108) and a propulsion system, such as first engine (110) and second engine (112). The aircraft (100) may also include one or more landing gear systems, such as first landing gear system (114) and second landing gear system (116).

The aircraft (100) may also include one or more hydraulic systems. For example, the one or more landing gear systems may include a braking system which includes hydraulics useful for braking the aircraft during landing. The aircraft (100) may also include a flap manipulation assembly (120) which allows the flaps (122) to be moved during various phases of aircraft operation. An example of part of the hydraulic system of a flap manipulation assembly is shown in FIG. 2.

Figure 2:
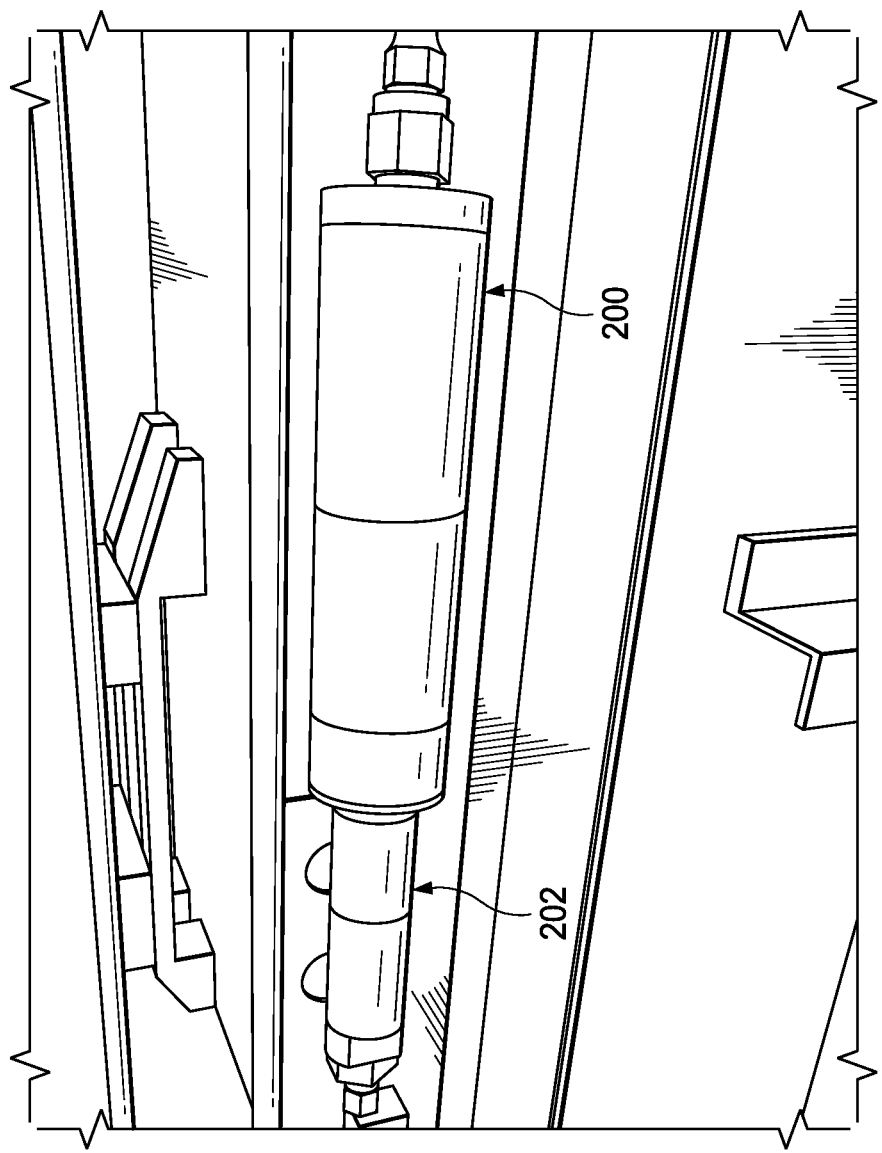
FIG. 2 shows a hydraulic fuse and a flow limiter, in accordance with one or more embodiments of the invention.

FIG. 2 shows a hydraulic fuse and a flow limiter, in accordance with one or more embodiments of the invention. FIG. 2 shows, in particular, two components interlocked with each other: a hydraulic fuse (200) and a flow limiter (202). The hydraulic fuse (200) and the flow limiter (202) are part of the flap manipulation assembly (120) of the aircraft (100) shown in FIG. 1. However, the hydraulic fuse (200) and the flow limiter (202) may be components in other hydraulic systems, such as the one or more landing gear systems. The hydraulic fuse (200) and the flow limiter (202) may also be part of hydraulic systems in other contexts, and thus is not necessarily limited to use within aircraft.

The hydraulic fuse (200) prevents the sudden loss of hydraulic fluid pressure within a line of the hydraulic system. Thus, in the event of one or more other hydraulic components operating outside of engineering tolerances, the hydraulic fuse (200) prevents or limits the degree of pressure loss in the fluid line to which the hydraulic fuse (200) is connected.

The flow limiter (202) may limit the flow of hydraulic fluid within the hydraulic system, regardless of whether the hydraulic fuse (202) is triggered or not. Thus, while the flow limiter (202) is shown in FIG. 2 as being directly connected to the hydraulic fuse (200), the flow limiter (202) may be a stand-alone component in a hydraulic system, or might be connected to other components in a hydraulic system.

Figure 3:
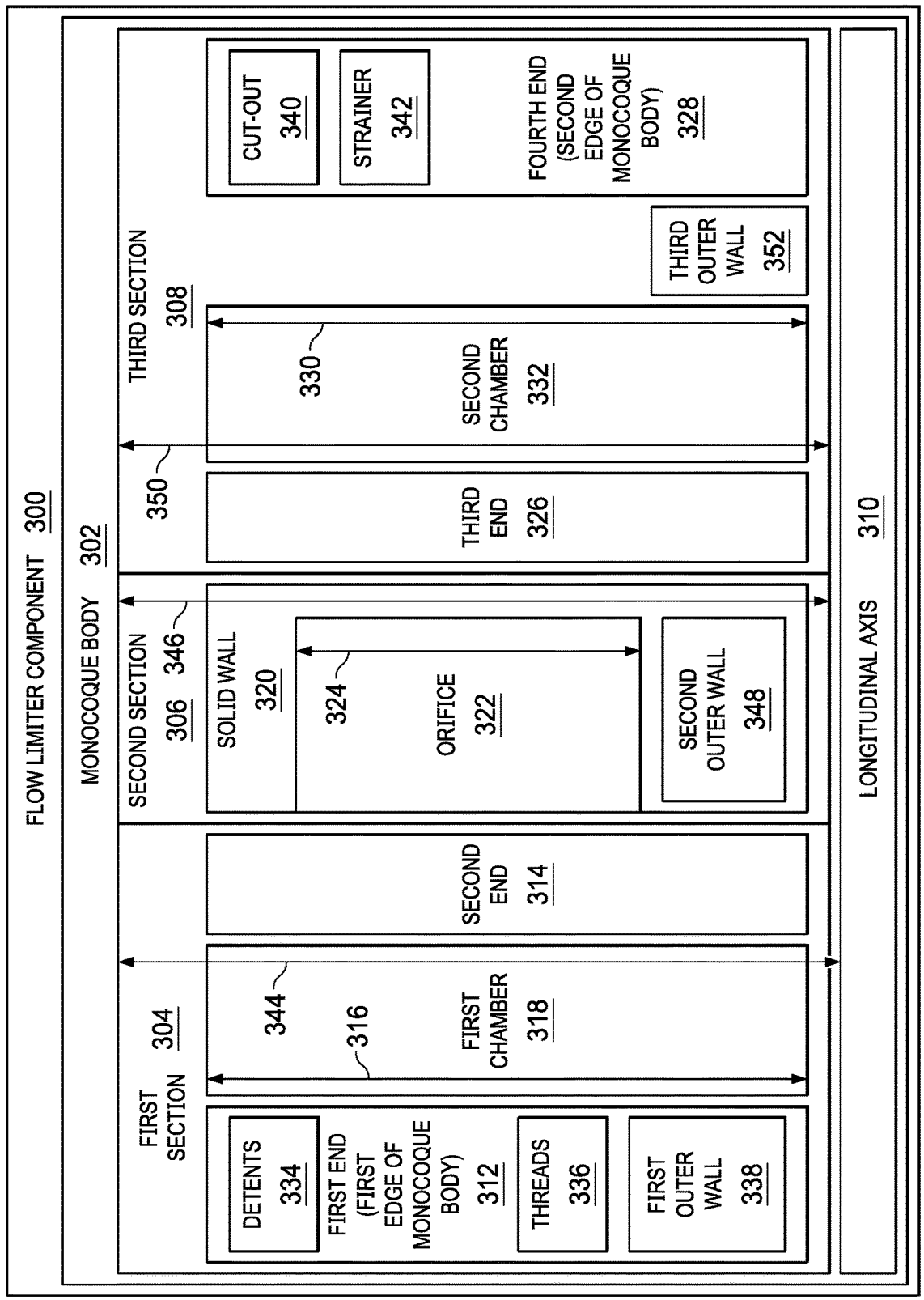
FIG. 3 shows a block diagram describing a flow limiter component, in accordance with one or more embodiments of the invention.

FIG. 3 shows a block diagram describing a flow limiter component, in accordance with one or more embodiments of the invention. The flow limiter component (300) may be one of the internal parts of the flow limiter (202) of FIG. 2. The flow limiter component (300) is described in general terms, as many different specific arrangements of the components of the flow limiter component (300) are possible, while maintaining the same relationships described for the flow limiter component (300) of FIG. 3. A specific example of the flow limiter component (300), within the context of a flow limiter, is shown in FIG. 6 through FIG. 14.

The flow limiter component (300) is formed from a monocoque body (302). As used herein, the term "monocoque body" refers to a single object formed as an integral piece of material manufactured to have the relative sizes and dimensions as described. Thus, while an objected formed as a "monocoque body" may have different sections, the sections smoothly and integrally merge into each other so as to form a single integral object. However, the one or more embodiments also contemplate embodiments where the sections of the flow limiter component (300) are manufactured separately and joined together, and thus the flow limiter component (300) need not be the monocoque body (302) in some embodiments.

In the embodiment described in FIG. 3, the monocoque body (302) includes a first section (304), a second section (306), and a third section (308). The three sections are arranged along a longitudinal axis (310) of the monocoque body (302).

The first section (304) includes a first end (312) defining a first edge of the monocoque body and a second end (314) bordering the second section (306). The first section (304) is further defined by a first inner diameter (316) relative to the longitudinal axis (310). The first inner diameter (316) defines a first chamber (318) inside the first section (304).

The second section (306) includes a solid wall (320). An orifice (322) is disposed in the solid wall (320), in fluid communication with the first chamber (318). The orifice (322) is defined by a second inner diameter (324) relative to the longitudinal axis (310).

The third section (308) includes a third end (326) bordering the second section (306) and a fourth end (328) defining a second edge of the monocoque body (302). The third section (308) also includes a third inner diameter (330) relative to the longitudinal axis (310). The third inner diameter (330) defines a second chamber (332) in the third section (308). The second chamber (332) is in fluid communication with the orifice (322). The first inner diameter (316) is greater than the third inner diameter (330), and the third inner diameter (330) is greater than the second inner diameter (324).

The flow limiter component (300) of FIG. 3 may be varied. For example, one or more detents (334) may be disposed in the first end (312) of the first section (304). The detents (334) may interlock with other components of the hydraulic system. Additionally, one or more threads (336) may be disposed on a first outer wall (338) of the first section (304). The one or more threads (336) may be facing externally from the first section (304) when acting as a male engaging section. The threads (336) may be facing internally from the first section (304) when acting as a female engaging section. Note that the threads (336) may be characterized as an interlocking component which locks the flow limiter component (300) in place within a flow limiter. One or more additional and/or substitute interlocking components may be present, as described with respect to FIG. 15.

In another embodiment, a cut-out (340) may be defined proximate the fourth end (328). In this case, a strainer (342) may be disposed in the cutout (340). The strainer (342) and the solid wall (320) further define borders of the second chamber (332).

In still another embodiment, the first section (304) has a first outer radius (344) of the first outer wall (338). The second section (306) has a variable second outer radius (346) that defines a second outer wall (348) of the second section (306) such that the second outer wall (348) is longitudinally sloped between the first section (304) and the third section (308). The third section (308) has a third outer radius (350) of a third outer wall (352) of the third section (308). The first outer radius (344) may be greater than the third outer radius (350). Alternatively, a first inner radius of the first chamber (318) is at least fifty percent larger than a second inner radius of the second chamber (332). In yet another alternative, the second inner radius of the second chamber (332) may be at least three times larger than a third inner radius of the orifice (322).

Still other variations are possible. Thus, while FIG. 3 shows a configuration of components, other configurations may be used without departing from the scope of the invention. For example, various components may be combined to create a single component. As another example, the functionality performed by a single component may be performed by two or more components.

Figure 4:
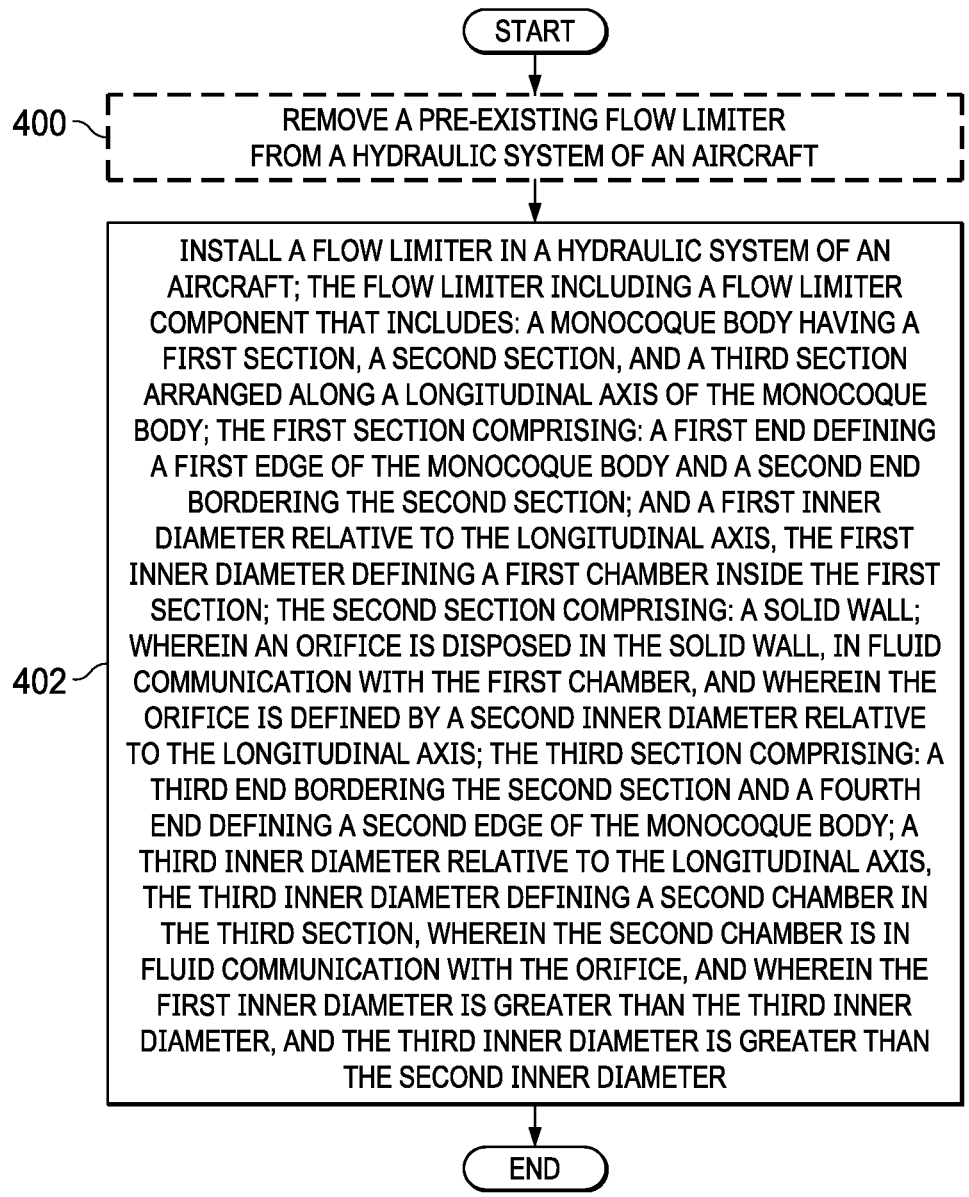
FIG. 4 shows a method of manufacturing, in accordance with one or more embodiments of the invention.

FIG. 4 shows a method of manufacturing, in accordance with one or more embodiments of the invention. The method shown in FIG. 4 may be used to manufacture the flow limiter component (300) shown in FIG. 3 or the flow limiter component shown in FIG. 6 through FIG. 14. The method shown in FIG. 4 may be accomplished using manufacturing equipment, including but not limited to lathes, molds, additive manufacturing machines, etc.

Optionally at step 400, prior to installing the flow limiter into the aircraft, the method may include removing a pre-existing flow limiter from the hydraulic system of the aircraft. In other words, the method may include performing maintenance on an aircraft by replacing the pre-existing flow limiter with the flow limiter of the one or more embodiments. In one embodiment, the method of FIG. 4 may terminate thereafter.

At step 402, a flow limiter is installed in a hydraulic system of an aircraft; the flow limiter including a flow limiter component that includes a monocoque body having a first section, a second section, and a third section arranged along a longitudinal axis of the monocoque body; the first section comprising: a first end defining a first edge of the monocoque body and a second end bordering the second section; and a first inner diameter relative to the longitudinal axis, the first inner diameter defining a first chamber inside the first section; the second section comprising: a solid wall; wherein an orifice is disposed in the solid wall, in fluid communication with the first chamber, and wherein the orifice is defined by a second inner diameter relative to the longitudinal axis; the third section comprising: a third end bordering the second section and a fourth end defining a second edge of the monocoque body; a third inner diameter relative to the longitudinal axis, the third inner diameter defining a second chamber in the third section, wherein the second chamber is in fluid communication with the orifice, and wherein the first inner diameter is greater than the third inner diameter, and the third inner diameter is greater than the second inner diameter.

While the various steps in this flowchart are presented and described sequentially, one of ordinary skill will appreciate that some or all of the steps may be executed in different orders, may be combined or omitted, and some or all of the steps may be executed in parallel. Furthermore, some steps may be performed actively or passively.

Figure 5:
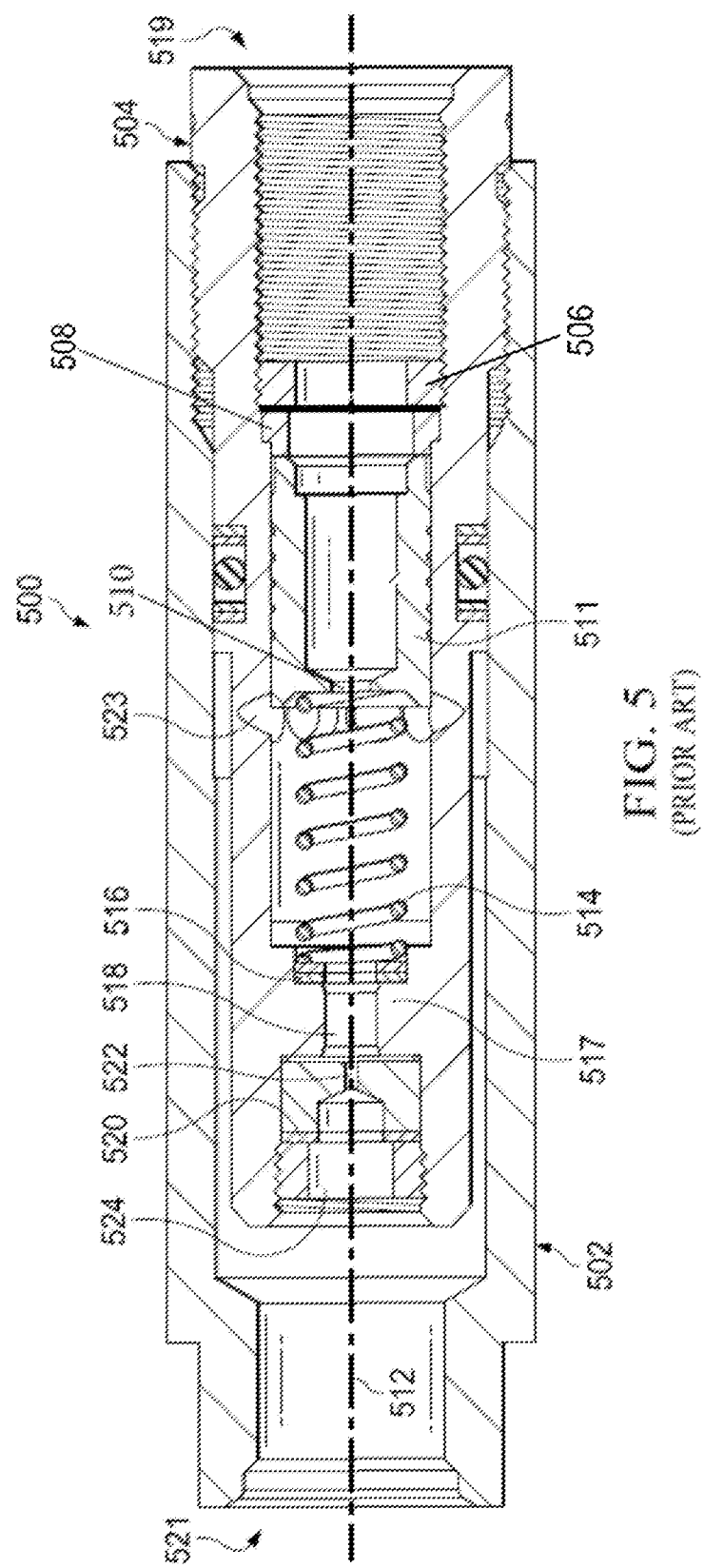
FIG. 5 shows a prior art flow limiter.

FIG. 5 shows a prior art flow limiter. The prior art flow limiter (500) includes a housing (502) and a sleeve (504) disposed inside the housing (502). A first lock nut (506) inside the sleeve (504) holds in place a stopper (508) and a first orifice (510) in a spool (511), also disposed inside the sleeve (504) longitudinally distally of the first lock nut (506) along a longitudinal axis (512).

A spring (514) urges a washer stack (516) against an internal stop (517) inside the sleeve (504) through which extends a second orifice (518). The spring (514) also pushes against the spool (511) at the other end of the spring. The degree of force that the spring (514) applies to the spool (511) may be varied by adding or removing one or more washers to or from the washer stack (516).

During normal operation, fluid pressure is applied from an inlet (519) towards an outlet (521) of the flow limiter. The fluid pressure applies a force to the spool (511), which in turn is resisted by the spring force of the spring (514). When the pressure in the line is below a threshold pressure set by the spring force, the spool is in a first position (shown in FIG. 5). In the first position, additional fluid is permitted to flow into holes (523), around an outer edge of the sleeve (504), and into the outlet (521), in addition to fluid flowing through the second orifice (518) and a third orifice (522). However, when the pressure in the line is above the threshold pressure set by the spring force, the spool is urged by the fluid pressure into a second position (not shown in FIG. 5) in which the spool moves longitudinally towards the outlet (521) and covers the holes (523). As a result, fluid is forced to move only through the orifices present inside the sleeve (504) (e.g., the second orifice (518) and the third orifice (522)). Accordingly, the flow of fluid through the prior art flow limiter (500) is restricted (i.e. limited) when the pressure in the line is above the threshold pressure.

On the other side of the prior art flow limiter (500), a second washer (520) is disposed on the other side of the internal stop (517) relative to the second orifice (518). The third orifice (522), smaller than the second orifice (518), extends through the second washer (520). A second lock nut (524) retains the second washer (520) inside the sleeve (504).

The prior art flow limiter (500) has some design features which may be undesirable for certain types of applications. First, the washer stack (516) may require adjustment (adding or removing washers) based on the performance of the particular hydraulic system in which the prior art flow limiter (500) is placed. Adjusting the washers may involve multiple iterations of assembly and disassembly of components in order to achieve the right size of washer stack. Second, the additional installation and assembly may require an undesirable amount of time. Third, the more parts that are in an assembly, the more likely the assembly may require maintenance. Fourth, production costs are higher in assemblies with more parts. Fifth, for heavy use applications, more frequent maintenance may be required. The one or more embodiments address these and other technical issues in flow limiters.

FIG. 6 through FIG. 14 show one specific example of the flow limiter component described with respect to FIG. 3, in the context of a flow limiter. The following example is for explanatory purposes only and not intended to limit the scope of the one or more embodiments. FIG. 6 through FIG. 14 should be considered together, and thus share common reference numerals.

Figure 6:
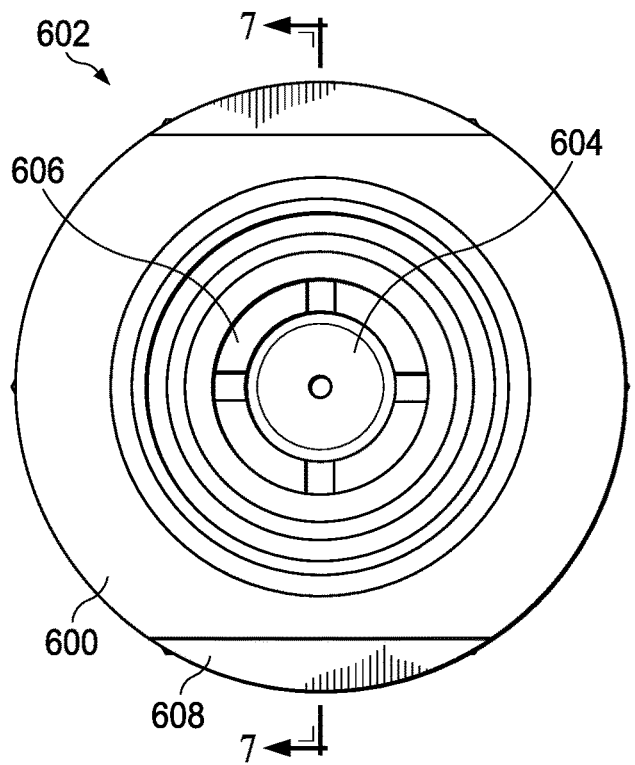
FIG. 6 shows a view of a flow limiter, in accordance with one or more embodiments of the invention.

Attention is first turned to FIG. 6. FIG. 6 shows a view of a flow limiter, in accordance with one or more embodiments of the invention. In particular, FIG. 6 shows a first terminal end (600) of the flow limiter (602). A first end (604) of a flow limiter component (606) can be seen through an opening in the housing (608) of the flow limiter (602).

Figure 7:
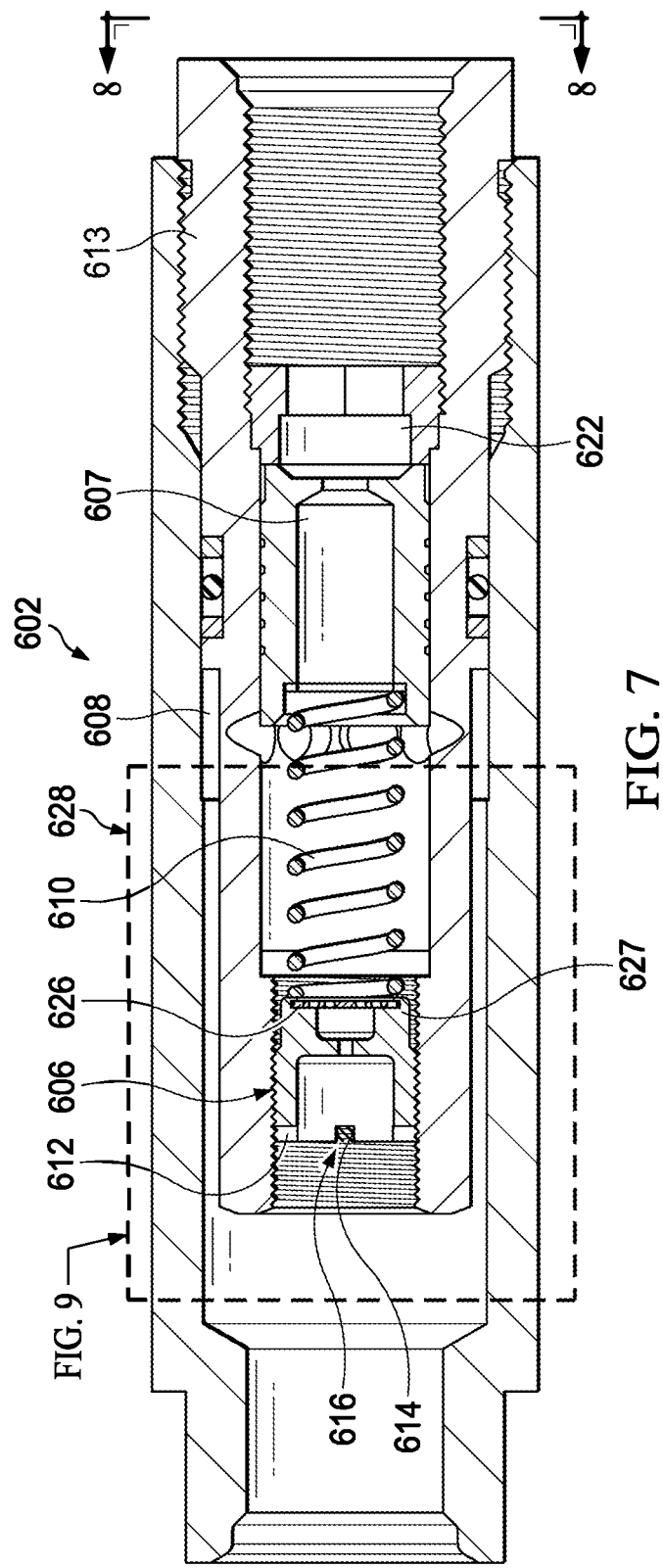
FIG. 7 shows a view of a flow limiter, in accordance with one or more embodiments of the invention.

FIG. 7 shows a view of a flow limiter with a flow limiter component, in accordance with one or more embodiments of the invention. In particular, FIG. 7 shows cross-section A-A of FIG. 6. As can be seen, the flow limiter (602) is different than the prior art flow limiter (500) shown in FIG. 5. In particular, a novel flow limiter component (606) is used, which eliminates several components in the prior art flow limiter (500) shown in FIG. 5. Eliminated components including the washer stack (516), the lock nut (524), and the additional washer (520).

In the example of FIG. 7, the spring (610) applies a force to a first end (627) of the flow limiter component (606), rather than against a washer stack as in the prior art flow limiter shown in FIG. 5. However, the flow limiter component (606) is constrained from moving within the flow limiter (602) via an interlocking mechanism, as shown in more detail in FIG. 13 and/or FIG. 15. To adjust the force the spring (610) will apply to the spool (607) of the flow limiter, the position of the flow limiter component (606) may be adjusted forwards or backwards along a longitudinal axis (see longitudinal axis (638) in FIG. 10), such as by screwing and/or unscrewing the flow limiter component (606) within the sleeve (613) of the flow limiter (602). Once the flow limiter component (606) is set to the location within the sleeve (613) which will result in the desired spring force being applied to the spool (607), the interlocking mechanism then will be set to prevent further movement of the flow limiter component (606)). The spool (607) may be secured on an end opposing the spring (610) via a locknut (622).

The flow limiter component (606) may be provided with detents, such as detent (614). The detents in the flow limiter component (606) may interlock with tabs, such as tab (616), in the sleeve (613) and/or in a stop (612) to further secure the flow limiter component (606) within the sleeve (613).

Figure 8:
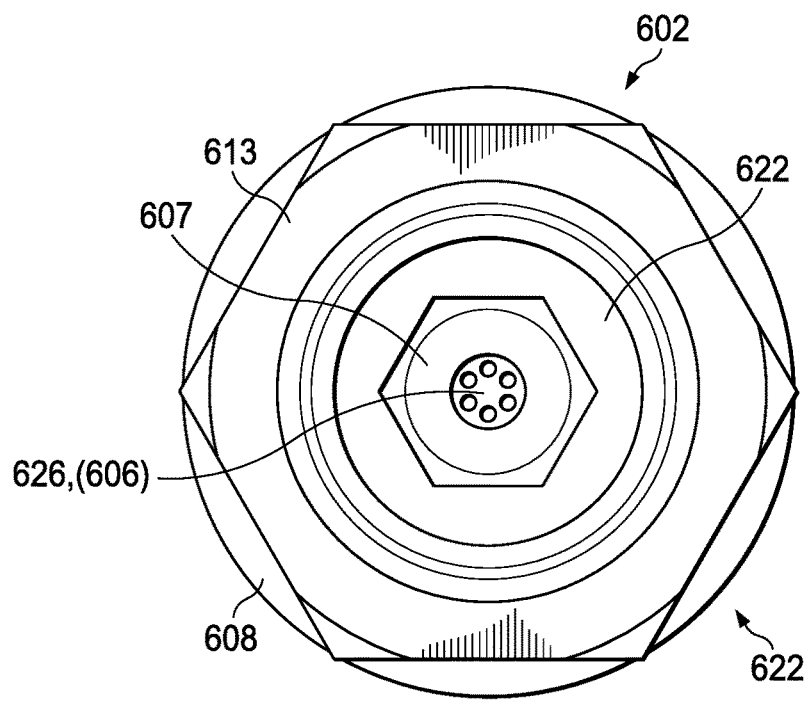
FIG. 8 shows a view of a flow limiter, in accordance with one or more embodiments of the invention.

FIG. 8 shows a view of a flow limiter with a flow limiter component, in accordance with one or more embodiments of the invention. Specifically, FIG. 8 shows cross-section B-B of FIG. 7.

In the view of FIG. 8, a second terminal end (618) of the flow limiter (602) can be seen. FIG. 8 also shows the housing (608), sleeve (613), the lock-nut (622) and the spool (607) against which the spring (610) pushes. A strainer (626) of the flow limiter component (606) is located on the second terminal end (618) of the flow limiter (602), and can be seen through the holes in the sleeve (613), lock-nut (622), and spool (607).

Figure 9:
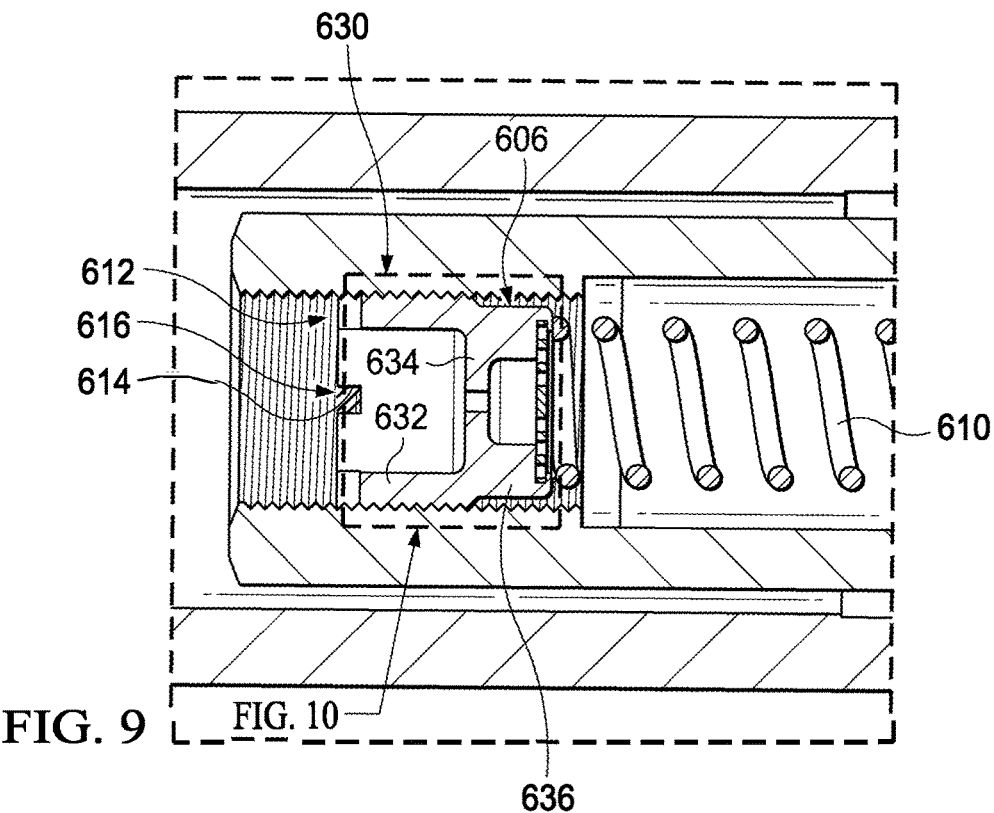
FIG. 9 shows a view of a flow limiter, in accordance with one or more embodiments of the invention.

FIG. 9 shows a view of a flow limiter with a flow limiter component, in accordance with one or more embodiments of the invention. Specifically, FIG. 9 shows a blown-up section (628) shown in dotted lines in FIG. 7. For reference, the spring (610), stop (612), and tab (616) are shown.

As can be seen, the flow limiter component (606) shown inside box (630) includes three sections: a first section (632), a second section (634), and a third section (636). In this example, each of the three sections are part of a monocoque body, as described with respect to FIG. 3. The detent (614) in the flow limiter component (606) may receive the tab (616) of the stop (612).

Figure 10:
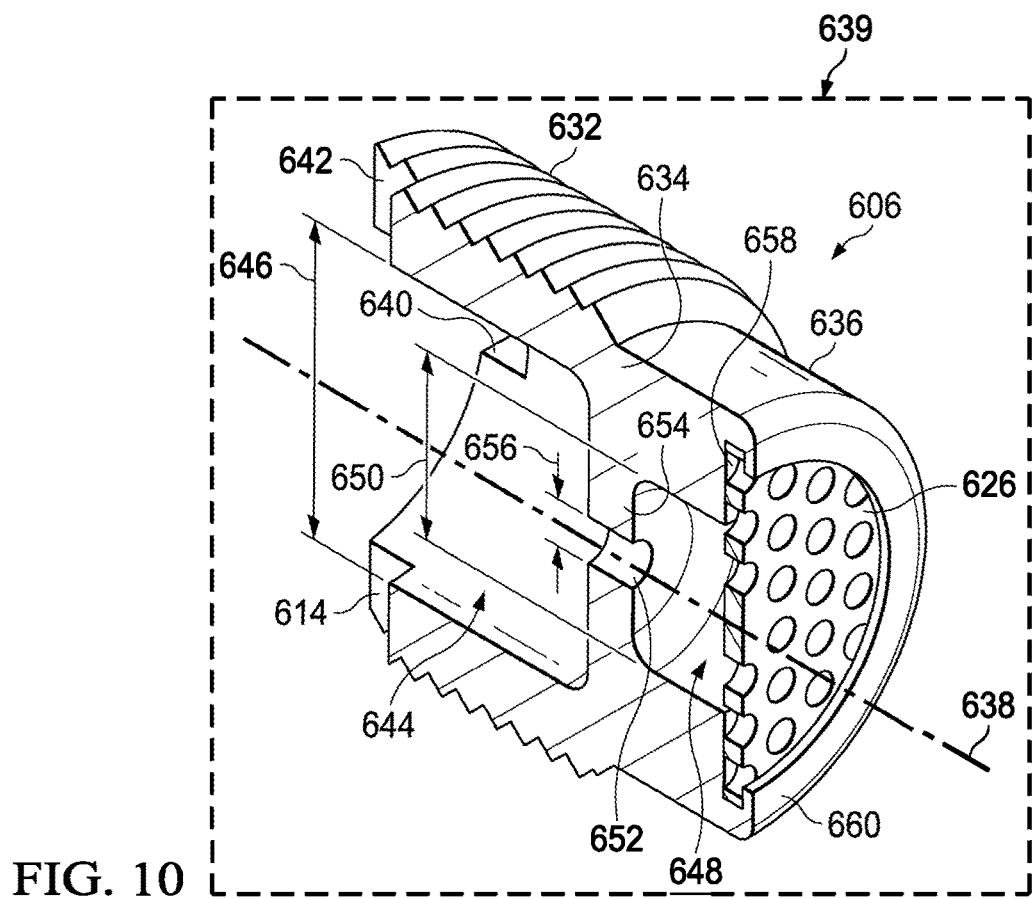
FIG. 10 shows a view of a component of the flow limiter, in accordance with one or more embodiments of the invention.

FIG. 10 shows a view of the flow limiter component, in accordance with one or more embodiments of the invention. Specifically, FIG. 10 shows a blown-up section (639) within the box (630) shown in FIG. 9.

In the flow limiter component (606) of FIG. 10, the first section (632), the second section (634), and the third section (636) are also shown as forming a monocoque body with a defined longitudinal axis (638). As can be seen, a first additional detent (640) and a second additional detent (642) are shown, in addition to the detent (614).

A first chamber (644) is defined by a first inner diameter (646) in the first section (632), the first inner diameter (646) defined with respect to the longitudinal axis (638). A second chamber (648) is defined by a second inner diameter (650) in the third section (636), the second inner diameter (650) also defined with respect to the longitudinal axis (638).

An orifice (652) is disposed through a solid wall (654) in the second section (634). The orifice (652) is defined by a third inner diameter (656), also defined with respect to the longitudinal axis (638).

In an embodiment, the first chamber (644) is larger than the second chamber (648). In turn, the second chamber (648) is larger than the orifice (652). This arrangement of chamber sizes helps to limit the flow of fluid through the flow limiter component (606), which helps provide for one of the functions of the flow limiter component (606).

In the event that foreign objects enter the fluid line, the strainer (626) is disposed at the second end of the flow limiter component (606). In particular, a cut-out (658) integrally formed with the third section (636) provides for a flange (660) in the third section (636) which retains the strainer (626).

Figure 11:
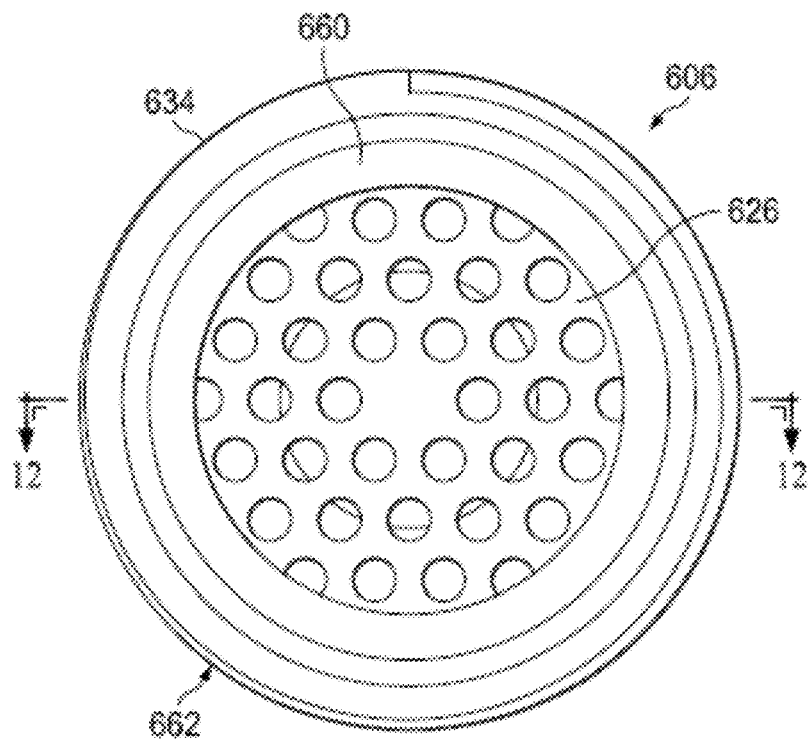
FIG. 11 shows a view of the component of the flow limiter, in accordance with one or more embodiments of the invention.

Attention is now turned to different views of the flow limiter component (606), as shown in FIG. 11. In particular, FIG. 11 shows a view of the flow limiter, in accordance with one or more embodiments of the invention. In particular, FIG. 11 shows the second end of the flow limiter component (606). As can be seen, the flange (660) retains the strainer (626). The variable outer radius (662) of the second section (634) can also be seen. The second chamber (648) can be seen through the holes of the strainer (626).

Figure 12:
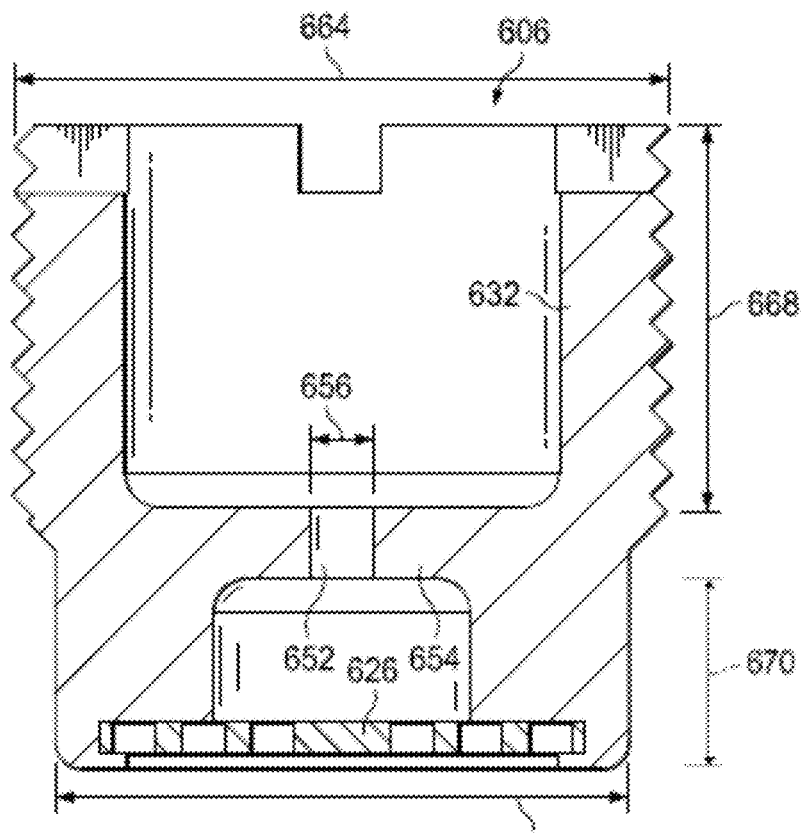
FIG. 12 shows a view of the component of the flow limiter, in accordance with one or more embodiments of the invention.

FIG. 12 shows a view of the flow limiter, in accordance with one or more embodiments of the invention. In particular, FIG. 12 shows a cross-section A-A of the flow limiter component (606) shown in FIG. 11. Again, the various elements described with respect to FIG. 10 can be seen, such as the third inner diameter (656) of the orifice (652), as well as the three sections, the first and second chambers, the detents, the solid wall (654) between the two chambers, and the strainer (626). In addition, FIG. 12 shows that a first outer diameter (664) of the first section (632) is greater than a second outer diameter (666) of the third section (636). Furthermore, the first length (668) of the first section (632) is greater than a second length (670) of the third section (636).

Figure 13:
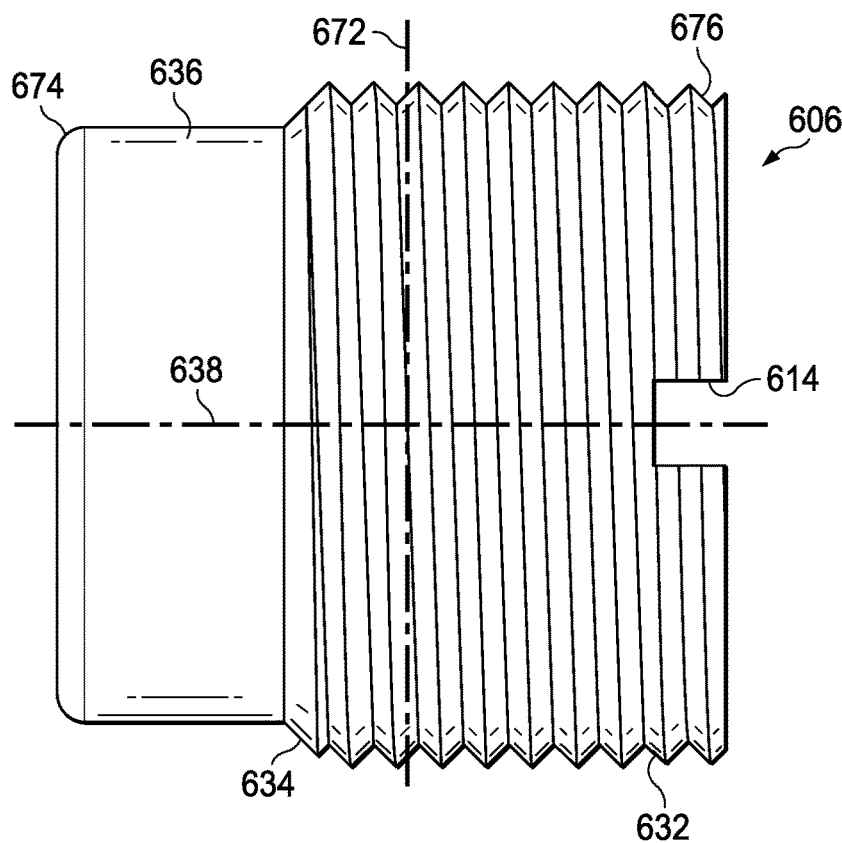
FIG. 13 shows a view of the component of the flow limiter, in accordance with one or more embodiments of the invention.

FIG. 13 shows a view of the flow limiter, in accordance with one or more embodiments of the invention. In particular, FIG. 13 shows the flow limiter component (606) flipped (relative to FIGS. 6 through FIG. 10) substantially a radial axis (672), which is defined relative to the longitudinal axis (638). Again, the first section (632), second section (634), and third section (636) are shown for reference, along with a detent (614). The edge (674) of the third section (636), which merges into the flange (not shown in FIG. 13), may be filleted in an embodiment.

In addition, one or more threads (676), such as helical threads, may be grooved into the outer surface of the first section (632), or may take the form of ridges extending outwardly from the outer surface of the first section (632). The one or more threads (676) may extend along some or all of the length of the first section (632). The one or more threads (676) may instead be present along the outer surface of the third section (636), or may extend along both the outer surfaces of the first section (632) and the third section (636). The one or more threads (676) may vary in pitch relative to the first section (632) and/or the third section (636). The one or more threads (676) may be a locking mechanism, or may be part of a locking mechanism, as described above, such as shown in FIG. 15.

Figure 14:
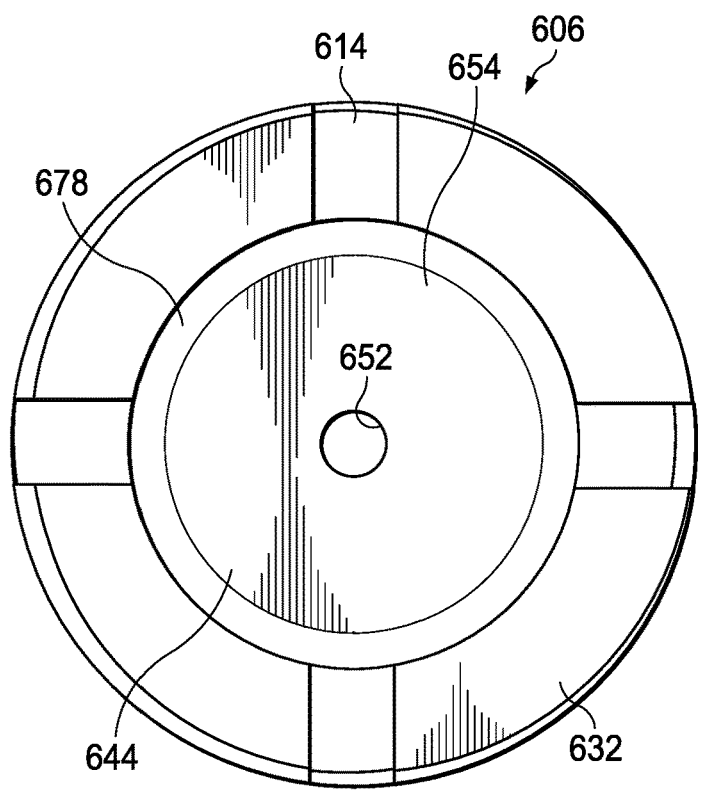
FIG. 14 shows a view of the component of the flow limiter, in accordance with one or more embodiments of the invention.

FIG. 14 shows a view of the flow limiter, in accordance with one or more embodiments of the invention. In particular, FIG. 14 shows the first end of the flow limiter component (606), at the edge of the first section (632). As can be seen, multiple detents, such as detent (614), may be present. The solid wall (654) between the first chamber (644) and the second chamber (not shown in FIG. 14) can also be seen, along with the orifice (652). If desirable, the edge (678) between the solid wall (654) and the inner wall of the first chamber (644) may be filleted.

Figure 15:
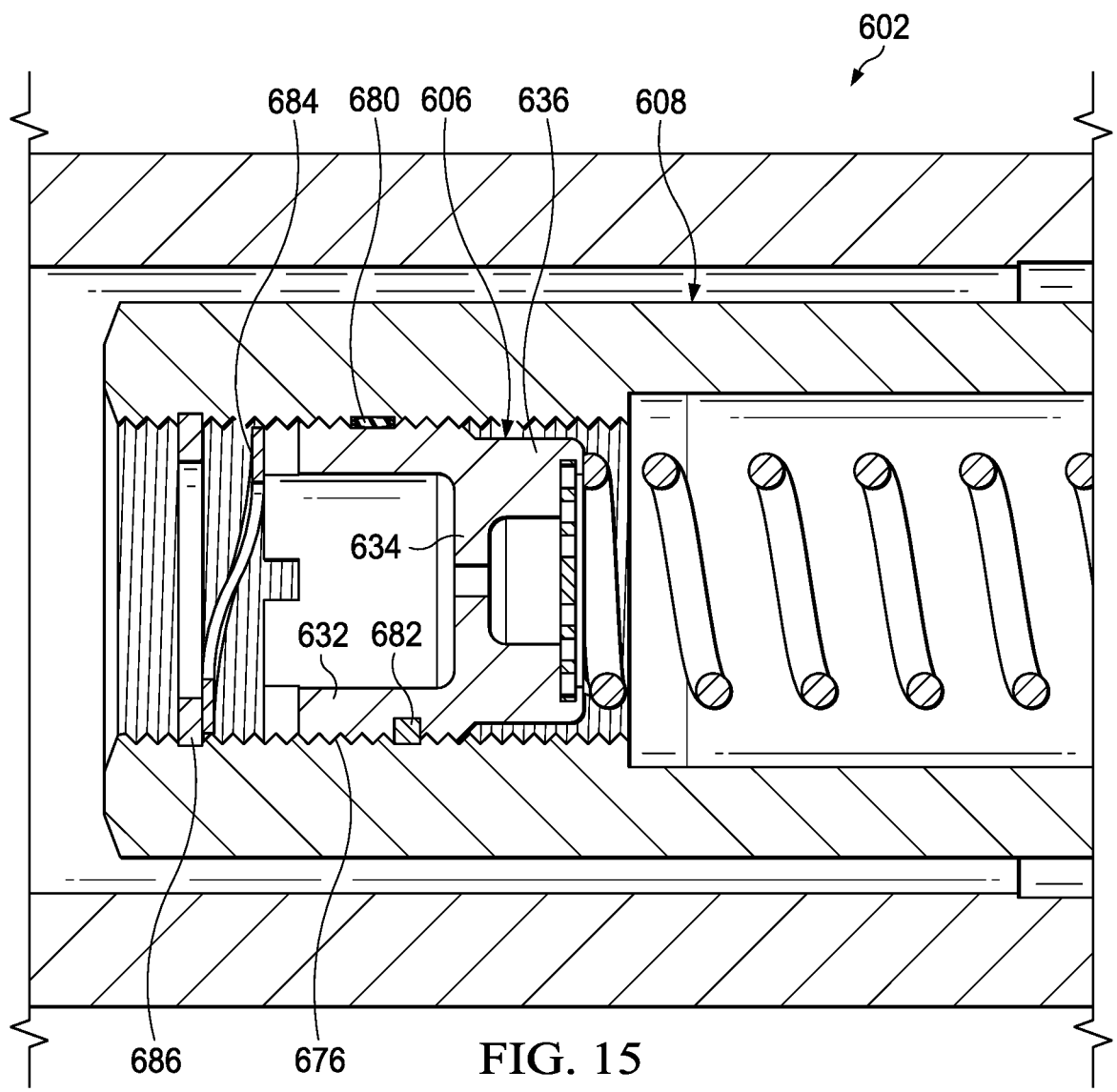
FIG. 15 shows another view of the flow limiter with the component, in accordance with one or more embodiments of the invention.

FIG. 15 shows another view of the flow limiter with the component, in accordance with one or more embodiments of the invention. The flow limiter (602) shown in FIG. 15 is a variation of the flow limiter (602) shown in FIG. 9. The flow limiter (602) shown in FIG. 15 includes additional interlocking mechanisms, in addition to the one or more threads (676) shown in FIG. 13. Reference numerals common to FIG. 9 and FIG. 13 refer to similar components and have similar descriptions.

In particular, FIG. 15 shows three additional interlocking mechanisms relative to the one or more threads (676). Each of the interlocking mechanisms may be used alone or in combination with one or more others of the interlocking mechanisms.

A first interlocking mechanism may be a press fitting (680) disposed between the flow limiter component (606) and the housing (608) of the flow limiter (602). The press fitting (680) may be disposed on one side of the flow limiter component (606), around the flow limiter component (606), or partially around the flow limiter component (606). The press fitting (680) may be formed from a deformable material which applies radial pressure to the flow limiter component (606). The press fitting may also fit inside groove disposed in the flow limiter component (606), thereby further securing the flow limiter component (606) within the flow limiter (602).

A second interlocking mechanism may be a post or ring (682). The post or ring (682) may extend from an inner wall of the housing (608) of the flow limiter (602) and into a hole or into a radial groove disposed in the flow limiter component (606). The post or ring (682) may be formed from a deformable material such that when sufficient force is applied to the flow limiter component (606), the flow limiter component (606) may be moved within the flow limiter (602).

A third interlocking mechanism may be spring washer (684). In this case, the first terminal end of the flow limiter component (606) rests against the spring washer (684). In this manner, the flow limiter component (606) may be allowed to move a small amount of longitudinal distance along the length of the flow limiter (602), depending on the degree of give in the spring washer (684).

A fixed washer (686) may be attached to the inner wall of the housing (608) of the flow limiter (602) in order to support the spring washer (684). The fixed washer (686) may be by itself (i.e., present without the spring washer (684)), and thus may be considered a fourth interlocking mechanism.

Thus, the one or more embodiments shown in FIG. 3 through FIG. 15 provide for a flow limiter component, which may be characterized as an orifice shaft sub assembly in which multiple features are integrated in order to perform multiple functions, such as adjusting spring forces to meet the performance characteristics of a valve, control fluid flow by a metered orifice, and filter particles to avoid blockage of the orifice. The one or more embodiments eliminates several components in prior art flow limiters, improves assembly time, and improves inspection time, and thereby reducing product cost and improving reliability. The orifice shaft subassembly is designed such that multiple functions can be achieved with a single subassembly.

The one or more embodiments provide for several functions. For example, the orifice shaft will be moved forward/backward with help of a thread mechanism to obtain a desired performance of the flow limiter. The orifice shaft can be locked in place by a locking feature integrated to the orifice shaft. The larger output orifice guides the flow through the tiny orifice to avoid pressure spikes and sudden pressure drops. In other words, the tiny orifice controls the output flow. In addition, a strainer integrated with the orifice shaft filters external particles and eliminates blockage of the tiny orifice.

The one or more embodiments completely eliminates a washer stack. Additionally, the threaded orifice shaft can be adjusted so that, in some cases, the washer stack in the flow limiter can be eliminated. Additionally, the output washer and the output lock nut may be eliminated. Because the one or more embodiments may be formed as a monocoque body, the one or more embodiments are relatively easier to manufacture and test relative to known flow limiters, thereby improving assembly time and reducing cost. The one or more embodiments are compact and the monocoque body increases reliability. Additionally, the flow limiters made using the flow limiter of the one or more embodiments may be easily installed in place of existing flow limiters, making retrofitting of aircraft and other hydraulic systems relatively simple.

Figure 16:
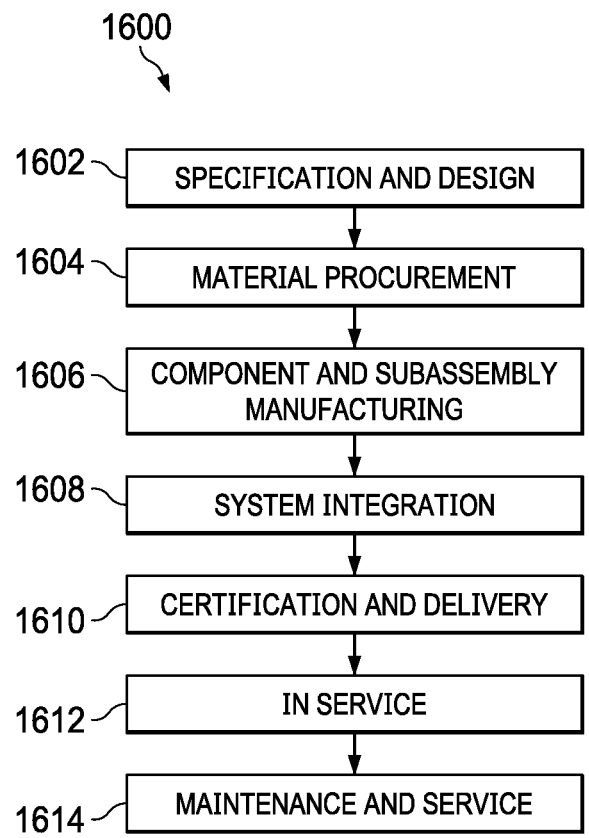
FIG. 16 illustrates an aircraft manufacturing and service method, in accordance with one or more embodiments.
Figure 17:
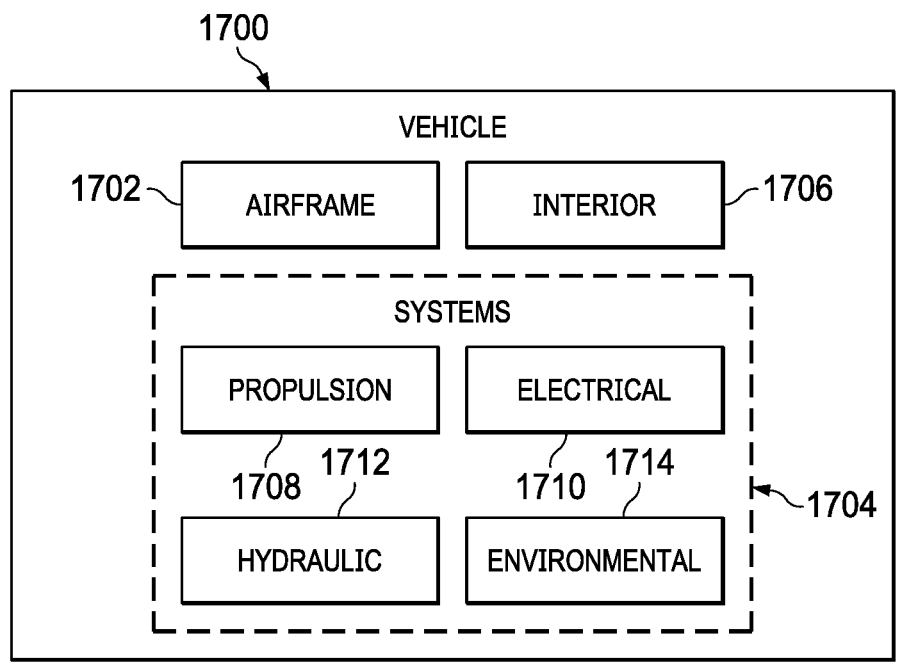
FIG. 17 illustrates an aircraft, in accordance with one or more embodiments.

FIG. 16 illustrates an aircraft manufacturing and service method, in accordance with one or more embodiments. FIG. 17 illustrates an aircraft, in accordance with one or more embodiments. FIG. 16 and FIG. 17 should be considered together. The methods and systems described with respect to FIG. 1 through FIG. 9 may be used in the context of the aircraft manufacturing and service method (1600) shown in FIG. 16. Similarly, the methods and system described with respect to FIG. 1 through FIG. 9 may be used to rework portions of the aircraft (1700) shown with respect to FIG. 17.

Turning to FIG. 16, during pre-production, the exemplary aircraft manufacturing and service method (1600) may include a specification and design (1602) of the aircraft (1700) in FIG. 17 and a material procurement (1604) for the aircraft (1700). During production, the component and subassembly manufacturing (1606) and system integration (1608) of the aircraft (1700) in FIG. 17 takes place. Thereafter, the aircraft (1700) in FIG. 17 may go through certification and delivery (1610) in order to be placed in service (1612). While in service by a customer, the aircraft (1700) in FIG. 17 is scheduled for routine maintenance and service (1614), which may include modification, reconfiguration, refurbishment, and other maintenance or service.

Each of the processes of the aircraft manufacturing and service method (1600) may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 17, an illustration of an aircraft (1700) is depicted in which an advantageous embodiment may be implemented. In this example, the aircraft (1700) is produced by the aircraft manufacturing and service method (1600) in FIG. 16. The aircraft (1700) may include airframe (1702) with systems (1704) and an interior (1706). Examples of systems (1704) include one or more of a propulsion system (1708), an electrical system (1710), a hydraulic system (1712), and an environmental system (1714). Any number of other systems may be included.

Although an aerospace example is shown, different advantageous embodiments may be applied to other industries, such as the automotive industry. Thus, for example, the aircraft (1700) may be replaced by an automobile or other vehicle or object in one or more embodiments.

The apparatus and methods embodied herein may be employed during any one or more of the stages of the aircraft manufacturing and service method (1600) in FIG. 16. For example, components or subassemblies produced in the component and subassembly manufacturing (1606) in FIG. 16 may be fabricated or manufactured in a manner similar to components or subassemblies produced while the aircraft (1700) is in service (1612) in FIG. 16.

Also, one or more apparatus embodiments, method embodiments, or a combination thereof may be utilized during production stages, such as the component and subassembly manufacturing (1606) and system integration (1608) in FIG. 16, for example, by substantially expediting the assembly of or reducing the cost of the aircraft (1700). Similarly, one or more of apparatus embodiments, method embodiments, or a combination thereof may be utilized while the aircraft (1700) is in service (1612) or during maintenance and service (1614) in FIG. 16.

For example, one or more of the advantageous embodiments may be applied during component and subassembly manufacturing (1606) to rework inconsistencies that may be found in composite structures. As yet another example, one or more advantageous embodiments may be implemented during maintenance and service (1614) to remove or mitigate inconsistencies that may be identified. Thus, the one or more embodiments described with respect to FIG. 1 through FIG. 9 may be implemented during component and subassembly manufacturing (1606) and/or during maintenance and service (1614) to remove or mitigate inconsistencies that may be identified.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A flow limiter component comprising:
   a monocoque body having a first section, a second section, and a third section arranged along a longitudinal axis of the monocoque body;
   the first section comprising:
      a first end defining a first edge of the monocoque body and a second end bordering the second section; and
      a first inner diameter relative to the longitudinal axis, the first inner diameter defining a first chamber inside the first section;
   the second section comprising:
      a solid wall;
      wherein an orifice is disposed in the solid wall, in fluid communication with the first chamber, and
      wherein the orifice is defined by a second inner diameter relative to the longitudinal axis;
   the third section comprising:
      a third end bordering the second section and a fourth end defining a second edge of the monocoque body;
      a third inner diameter relative to the longitudinal axis, the third inner diameter defining a second chamber in the third section, wherein the second chamber is in fluid communication with the orifice, and
wherein the first inner diameter is greater than the third inner diameter, and the third inner diameter is greater than the second inner diameter;
a cut-out defined in the third section, proximate the fourth end, wherein the cut-out is further defined between the second chamber and a flange of the fourth end of the third section, wherein the flange forms at least a part of an outer edge of the third section, and wherein the cut-out has a cut-out diameter greater than the third inner diameter; and
a strainer disposed in the cut-out and having a strainer diameter that is larger than the third inner diameter but smaller than or equal to the cut-out diameter, wherein the strainer and the solid wall further define borders of the second chamber, and wherein the flange retains the strainer.

2. The flow limiter component of claim 1, further comprising:
a plurality of detents disposed in the first end.

3. The flow limiter component of claim 1, further comprising:
a plurality of threads disposed on a first outer wall of the first section, the plurality of threads facing externally from the first section.

4. The flow limiter component of claim 1, further comprising:
a plurality of detents disposed in the first end; and
a plurality of threads disposed on a first outer wall of the first section, including on the plurality of detents, wherein the plurality of threads face externally from the first section.

5. The flow limiter component of claim 1, further comprising:
a spring having a first end and a second end, wherein the first end of the spring is disposed against at least the flange of the fourth end of the third section.

6. The flow limiter component of claim 1, wherein:
the first section comprises a first outer diameter of a first outer wall;
the second section comprises a variable second outer diameter that defines a second outer wall of the second section such that the second outer wall is longitudinally sloped between the first section and the third section;
the third section comprises a third outer diameter of a third outer wall of the third section.

7. The flow limiter component of claim 6, wherein:
the first outer diameter is greater than the third outer diameter.

8. The flow limiter component of claim 1, wherein:
the first inner diameter of the first chamber is at least fifty percent larger than the third inner diameter of the second chamber.

9. The flow limiter component of claim 8, wherein
the third inner diameter of the second chamber is at least three times larger than a the second inner diameter of the orifice.

10. An aircraft comprising:
a fuselage;
a hydraulic system disposed in the fuselage;
a flow limiter operably disposed in the hydraulic system, the flow limiter comprising a flow limiter component comprising:
a monocoque body having a first section, a second section, and a third section arranged along a longitudinal axis of the monocoque body;
the first section comprising:
a first end defining a first edge of the monocoque body and a second end bordering the second section; and
a first inner diameter relative to the longitudinal axis, the first inner diameter defining a first chamber inside the first section;
the second section comprising:
a solid wall;
wherein an orifice is disposed in the solid wall, in fluid communication with the first chamber, and
wherein the orifice is defined by a second inner diameter relative to the longitudinal axis;
the third section comprising:
a third end bordering the second section and a fourth end defining a second edge of the monocoque body;
a third inner diameter relative to the longitudinal axis, the third inner diameter defining a second chamber in the third section,
wherein the second chamber is in fluid communication with the orifice, and
wherein the first inner diameter is greater than the third inner diameter, and the third inner diameter is greater than the second inner diameter;
a cut-out defined in the third section, proximate the fourth end, wherein the cut-out is further defined between the second chamber and a flange of the fourth end of the third section, wherein the flange forms at least a part of an outer edge of the third section, and wherein the cut-out has a cut-out diameter greater than the third inner diameter; and
a strainer disposed in the cut-out and having a strainer diameter that is larger than the third inner diameter but smaller than or equal to the cut-out diameter, wherein the strainer and the solid wall further define borders of the second chamber, and wherein the flange retains the strainer.

11. The aircraft of claim 10, further comprising:
a plurality of detents disposed in the first end.

12. The aircraft of claim 10, further comprising:
a plurality of threads disposed on a first outer wall of the first section, the plurality of threads facing externally from the first section.

13. The aircraft of claim 10, further comprising:
a plurality of detents disposed in the first end; and
a plurality of threads disposed on a first outer wall of the first section, including on the plurality of detents, the plurality of threads facing externally from the first section.

14. The aircraft of claim 10, further comprising:
a spring having a first end and a second end, wherein the first end of the spring is disposed against at least the flange of the fourth end of the third section.

15. The aircraft of claim 10, wherein:
the first section comprises a first outer diameter of a first outer wall of the first section;
the second section comprises a variable second outer diameter that defines a second outer wall of the second section such that the second outer wall is longitudinally sloped between the first section and the third section;
the third section comprises a third outer diameter of a third outer wall of the third section.

16. The aircraft of claim 15, wherein:
the first outer diameter is greater than the third outer diameter.

17. The aircraft of claim 10, wherein:
the first inner diameter of the first chamber is at least fifty percent larger than the third inner diameter of the second chamber, and
the third inner diameter of the second chamber is at least three times larger than the second inner diameter of the orifice.

18. The aircraft of claim 10, further comprising:
a landing gear system disposed in the fuselage, the landing gear system having the hydraulic system.

19. A method comprising:
installing a flow limiter in a hydraulic system of an aircraft, the flow limiter comprising a flow limiter component comprising:
a monocoque body having a first section, a second section, and a third section arranged along a longitudinal axis of the monocoque body;
the first section comprising:
  a first end defining a first edge of the monocoque body and a second end bordering the second section; and
  a first inner diameter relative to the longitudinal axis, the first inner diameter defining a first chamber inside the first section;
the second section comprising:
  a solid wall;
  wherein an orifice is disposed in the solid wall, in fluid communication with the first chamber, and
  wherein the orifice is defined by a second inner diameter relative to the longitudinal axis;
the third section comprising:
  a third end bordering the second section and a fourth end defining a second edge of the monocoque body;
  a third inner diameter relative to the longitudinal axis, the third inner diameter defining a second chamber in the third section,
  wherein the second chamber is in fluid communication with the orifice, and
  wherein the first inner diameter is greater than the third inner diameter, and the third inner diameter is greater than the second inner diameter;
  a cut-out defined in the third section, proximate the fourth end, wherein the cut-out is further defined between the second chamber and a flange of the fourth end of the third section, wherein the flange forms at least a part of an outer edge of the third section, and wherein the cut-out has a cut-out diameter greater than the third inner diameter; and
  a strainer disposed in the cut-out and having a strainer diameter that is larger than the third inner diameter but smaller than or equal to the cut-out diameter, wherein the strainer and the solid wall further define borders of the second chamber, and wherein the flange retains the strainer.

20. The method of claim 19, further comprising:
prior to installing the flow limiter into the aircraft, removing a pre-existing flow limiter from the hydraulic system of the aircraft.

\* \* \* \* \*